US009960698B2

(12) United States Patent
Nagashima et al.

(10) Patent No.: US 9,960,698 B2
(45) Date of Patent: May 1, 2018

(54) RELIABLE AC-DC POWER CONVERTER WITH HIGH VOLTAGE DC LINK

(71) Applicant: Flex Power Control, Inc., Woodland Hills, CA (US)

(72) Inventors: James Michio Nagashima, Cerritos, CA (US); Gregory Scott Smith, Woodland Hills, CA (US)

(73) Assignee: Flex Power Control, Inc., Woodland Hills, CA (US)

( * ) Notice: Subject to any disclaimer, the term of this patent is extended or adjusted under 35 U.S.C. 154(b) by 0 days. days.

(21) Appl. No.: 14/975,677

(22) Filed: Dec. 18, 2015

(65) Prior Publication Data

US 2016/0181944 A1 Jun. 23, 2016

Related U.S. Application Data

(60) Provisional application No. 62/095,204, filed on Dec. 22, 2014, provisional application No. 62/095,396, (Continued)

(51) Int. Cl.
*H02M 3/335* (2006.01)
*B60L 11/18* (2006.01)
*H02J 3/38* (2006.01)
*H02M 7/219* (2006.01)
*H02M 7/5387* (2007.01)
*H02J 3/14* (2006.01)
*H02J 3/32* (2006.01)

(52) U.S. Cl.
CPC ....... *H02M 3/33584* (2013.01); *B60L 11/185* (2013.01); *B60L 11/1812* (2013.01); *B60L 11/1816* (2013.01); *B60L 11/1824* (2013.01); *B60L 11/1842* (2013.01); *H02J 3/14* (2013.01); *H02J 3/383* (2013.01); *H02M 7/219* (2013.01); *H02M 7/5387* (2013.01); *B60L 2230/22* (2013.01); *B60L 2230/30* (2013.01); *H02J 3/32* (2013.01); *H02J 3/385* (2013.01); *H02J 2003/143* (2013.01); *Y02B 70/3225* (2013.01); *Y02E 10/563* (2013.01); *Y02E 60/721* (2013.01); *Y02T 10/7005* (2013.01); *Y02T 10/7088* (2013.01); *Y02T 10/92* (2013.01); *Y02T 90/121* (2013.01); *Y02T 90/127* (2013.01); *Y02T 90/128* (2013.01); *Y02T 90/14* (2013.01); *Y04S 10/126* (2013.01); *Y04S 20/222* (2013.01)

(58) Field of Classification Search
CPC ........................... H02M 3/22; H02M 3/33569
USPC .................................................... 363/15, 17
See application file for complete search history.

(56) References Cited

U.S. PATENT DOCUMENTS

5,801,517 A * 9/1998 Borle ................ H02M 7/53871
                                                       323/207
7,764,527 B2    7/2010 Takayanagi
                        (Continued)

*Primary Examiner* — Adolf Berhane
*Assistant Examiner* — Afework Demisse
(74) *Attorney, Agent, or Firm* — Smyrski Law Group, A P.C.

(57) ABSTRACT

An AC to DC converter system is provided. The system includes a bidirectional boost converter circuit coupled to an AC input, a high voltage DC link capacitor circuit coupled to the bidirectional boost converter and comprising at least one capacitor, and a DC to DC converter circuit coupled to the high voltage DC link capacitor circuit and a DC input, wherein the at least one capacitor may include a film capacitor.

19 Claims, 7 Drawing Sheets

Related U.S. Application Data filed on Dec. 22, 2014, provisional application No. 62/095,432, filed on Dec. 22, 2014.

(56) References Cited

U.S. PATENT DOCUMENTS

| | | | | |
|---|---|---|---|---|
| 2006/0103341 A1* | 5/2006 | Steigerwald | ........ | H02M 3/1582 318/712 |
| 2008/0013351 A1* | 1/2008 | Alexander | .......... | H02M 3/1582 363/123 |
| 2012/0257429 A1* | 10/2012 | Dong | .................. | H02M 3/1582 363/127 |
| 2013/0094261 A1* | 4/2013 | Kern | ....................... | H02J 3/383 363/98 |

* cited by examiner

RELIABLE AC-DC POWER CONVERTER WITH HIGH VOLTAGE DC LINK

This application claims priority based on:

U.S. Provisional Patent Application Ser. No. 62/095,204, inventors James Nagashima et al., entitled "Multi-Functional Power Management System," filed Dec. 22, 2014;

U.S. Provisional Patent Application Ser. No. 62/095,396, inventors James Nagashima et al., entitled "Highly Reliable AC-DC Power Converter with High Voltage DC Link," filed Dec. 22, 2014, and U.S. Provisional Patent Application Ser. No. 62/095,432, inventors James Nagashima et al., entitled "Method to Reduce Losses in a High Voltage DC Link Converter," filed Dec. 22, 2014, and the present application is being filed concurrently with:

U.S. patent application Ser. No. 14/975,693, inventors James Nagashima et al., entitled "Method to Reduce Losses in a High Voltage DC Link Converter," and U.S. patent application Ser. No. 14/975,701, inventors James Nagashima et al., entitled "Multi-Functional Power Management System,"

the entirety of all of which are incorporated herein by reference.

BACKGROUND OF THE INVENTION

Field of the Invention

The present invention relates generally to AC to DC power converters or rectifiers. More specifically, the present invention relates to techniques for reducing or eliminating the need for aluminum electrolytic capacitors in power circuits using metalized film capacitors.

Description of the Related Art

The reliability of today's Alternating Current (AC) to Direct Current (DC) converter, or rectifier, is based on many factors including individual component reliability, stress de-rating, operational temperature, and manufacturing processes.

One of the major known issues with component reliability is the use of aluminum electrolytic capacitors found in current designs. This type of capacitor is used in applications where a high capacitance to volume ratio is beneficial. In single phase AC to DC power converter systems, line voltage varies sinusoidally from a maximum value to zero at the line frequency. At zero voltage power cannot be generated, while at low voltages little power is available. In modern power converter designs there is usually a requirement to have a power factor close to unity operating at a high efficiency, where power factor is defined as the ratio of real power to apparent power (real plus reactive power). Power delivered varies at the line frequency on the AC side of the converter.

On the DC side, power is normally constant in most applications, such as a Photovoltaic (PV) solar panel array or a battery charger. In order to transform constant power into variable power, some form of energy storage mechanism is involved. In today's conventional single phase converters, a bank of aluminum electrolytic capacitors situated is provided for storing energy, or acting as a power sink, when excess power is available. This arrangement supplies energy, or acts as a power source, when needed. In general, an aluminum electrolytic capacitor tends to be an economical choice. However, this type of capacitor has a known wear characteristic due to the problematic drying out of the inherent liquid electrolyte. This wear characteristic limits the lifetime of electrolytic based capacitors to around 10 years in a conventional converter.

Recently, there has been a surge in the use of transformer-free power inverters. This type of inverter does not include an isolation transformer. No intermediate DC link capacitor is provided, but a DC capacitor is positioned in parallel with the DC input originating from the solar panel array, or battery. In this arrangement, the value of capacitance increases since the panel voltage is known, in the solar panel array context, to vary as a function of the solar irradiance incident on the solar panel array surface. Current operating voltages in such solar panels can vary from 100 to 400 volts DC in a typical PV string. In order for these designs to deliver sufficient power without a large current ripple at low voltages, a large number, or bank formation, of capacitors must be provided.

Since electrolytic capacitors have known reliability issues, many designers eliminate them from consideration. For example, the electric vehicle industry has already discontinued use of electrolytic capacitors in product implementations. This was made possible because the inverters required for EV traction drives are provided with DC from a battery and convert DC to 3-phase AC for electric motor propulsion, resulting in low energy storage requirements. In the photovoltaic industry, the application is DC provided from the solar array conversion to single phase AC output, for example supplying power to a home or returning power to the AC grid, where energy storage requirements for such photovoltaic/solar array applications are much larger.

It would therefore be advantageous to provide a system that overcomes known component lifetime limitations in power circuit designs while improving overall system reliability.

SUMMARY OF THE INVENTION

According to one aspect of the present design, there is provided an AC to DC converter system. The system includes a single phase AC energy source, a DC energy source, a bi-directional AC to DC boost converter circuit coupled to the single phase AC energy source, and a high voltage intermediate DC link circuit coupled to the bi-directional AC to DC Boost Converter and comprising at least one film capacitor.

According to a second aspect of the present design, there is provided an AC to DC converter system comprising an AC input and a DC input, a bidirectional boost converter circuit coupled to the AC input, a high voltage DC link capacitor circuit coupled to the bidirectional boost converter and comprising multiple capacitors connected in parallel, and a DC to DC converter circuit coupled to the high voltage DC link capacitor circuit and the DC input.

According to a further embodiment of the present design, there is provided an AC to DC converter system comprising an AC input and a DC input, bidirectional boost converter means coupled to the AC input, high voltage DC link capacitor means coupled to the bidirectional boost converter means and comprising multiple capacitors connected in parallel, and DC to DC converter means coupled to the high voltage DC link capacitor means and the DC input.

These and other advantages of the present invention will become apparent to those skilled in the art from the following detailed description of the invention and the accompanying drawings.

BRIEF DESCRIPTION OF THE DRAWINGS

For a more complete understanding of the present disclosure, reference is now made to the following figures, wherein like reference numbers refer to similar items throughout the figures.

DETAILED DESCRIPTION

The following description and the drawings illustrate specific embodiments sufficiently to enable those skilled in the art to practice the system and method described. Other embodiments may incorporate structural, logical, process and other changes. Examples merely typify possible variations. Individual elements and functions are generally optional unless explicitly required, and the sequence of operations may vary. Portions and features of some embodiments may be included in, or substituted for, those of others.

A reliable AC to DC converter is provided. The converter is comprised of two conversion stages to decouple DC link capacitors from the DC input. The use of two conversion stages enables increasing DC link voltage which in turn reduces the amount of required capacitance for energy storage. The relationship between capacitance and voltage is in this type of circuit known to decrease exponentially. The reduced capacitance at a higher voltage permits using metalized film capacitors instead of aluminum electrolytic capacitors. Film capacitors have substantially longer lifetimes that will improve the reliability of the converter to meet current industry demands. New semiconductor switches, such as wide band-gap devices with higher breakdown voltages and lower switching losses, are a good match for operating at the higher DC link voltages.

The improved inverter uses a two stage bi-directional converter comprising a high frequency switching AC to DC boost converter, DC link capacitor, high frequency switching DC to DC converter, and an isolation transformer. Since there are two conversion stages, the DC link voltage can be chosen to be any value higher than the peak AC voltage, which is 356 volts DC for a 240 volt AC line (peak voltage for 240V AC is 340V DC, but accounting for a plus five percent voltage of 252V AC yields a 356V DC peak). Use of such a high DC link voltage is due to the presence of a boost converter that requires the DC output to be higher than the AC input. The highest operating voltage value of the DC link is determined by the breakdown voltage of the switches, and in this case we use 1200V devices but higher breakdown voltages may be employed. One range of potential values is approximately 750-1,000 volts DC. Energy stored in a capacitor increases as the voltage squared, or conversely the capacitance may be decreased by the square root of the voltage, thus dramatically reducing required capacitance in size as a result of increasing the DC link voltage. For example, if the DC voltage is raised from 336 volts to 1,000 volts, the capacitance needed may be reduced by a factor of approximately 9:1. The present design reduces the amount of capacitance required in a single stage converter compared to a dual stage converter. The single stage has the capacitor on the DC input and is sized for the lowest DC voltage, typically 250V DC. So a value of 800V DC for the dual stage capacitor yields a ratio of (800/250) squared, or approximately 10:1.

Designs employing such a reduction in capacitance of this magnitude enable the use of plastic film capacitors. Plastic film capacitors are known to exhibit a lower capacitance to volume ratio and provide a significantly higher reliability. Film capacitors are made from many different materials and can be selected for the particular application. Some of the important advantages of these types of capacitors are: long service life since there is no liquid electrolyte, capability of very high breakdown voltages, self healing for pin holes resulting from dielectric breakdowns, non-polarized operation, low power dissipation, and high ripple current capacity. Note that this technique is generally not employed with single stage converters since no intermediate link capacitor is employed, and the capacitance must be positioned on the DC input and will typically operate at the input voltage.

The following detailed description is merely illustrative in nature and is not intended to limit the embodiments of the subject matter or the application and uses of such embodiments. Furthermore, there is no intention to be bound by any expressed or implied theory presented herein.

Figure 1:
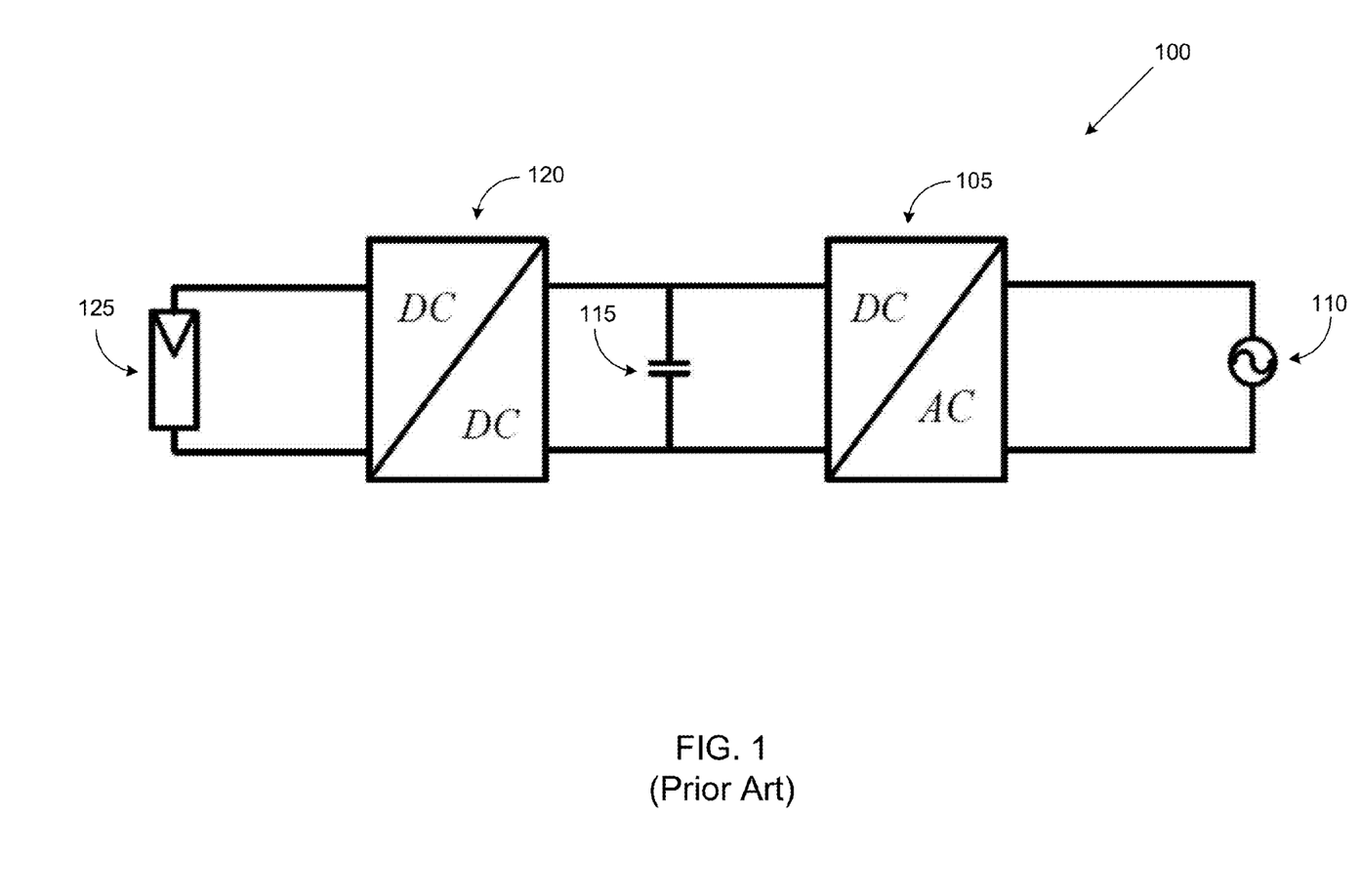
FIG. 1 is a general schematic representation of a conventional two stage AC-DC converter.

Techniques and technologies may be described herein in terms of functional and/or logical block components and with reference to symbolic representations of operations, processing tasks, and functions that may be performed by various computing components or devices. For the sake of brevity, conventional techniques related to inverters, dc to dc converters, photovoltaic components and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. The following description refers to elements or nodes or features being "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter. The description used herein is for a reliable AC to DC power converter with a high voltage DC link that represents an exemplary embodiment, but the not intended to be the only application of the invention.

Figure 2:
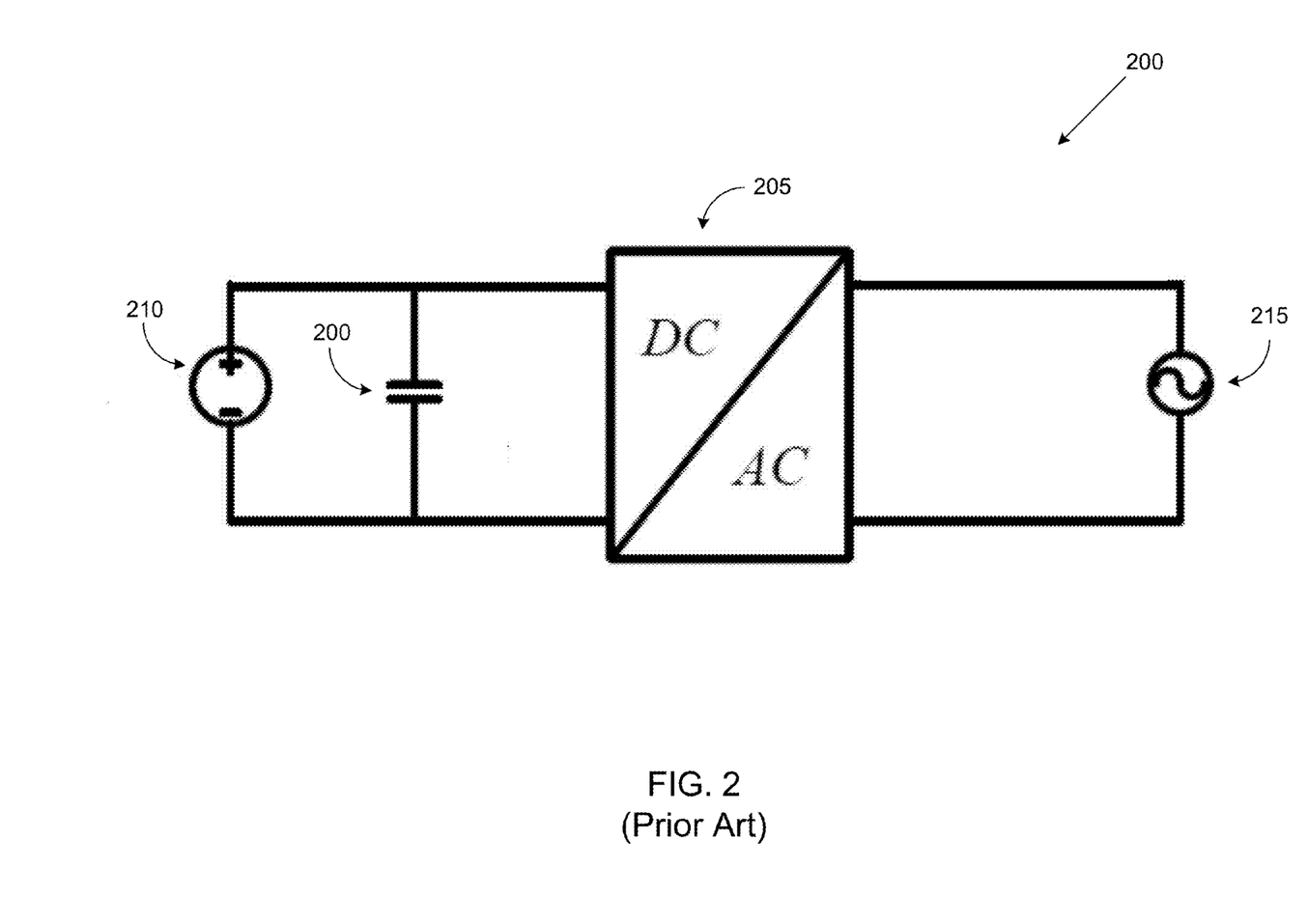
FIG. 2 is a general schematic representation of a conventional single stage AC-DC converter.
Figure 3:
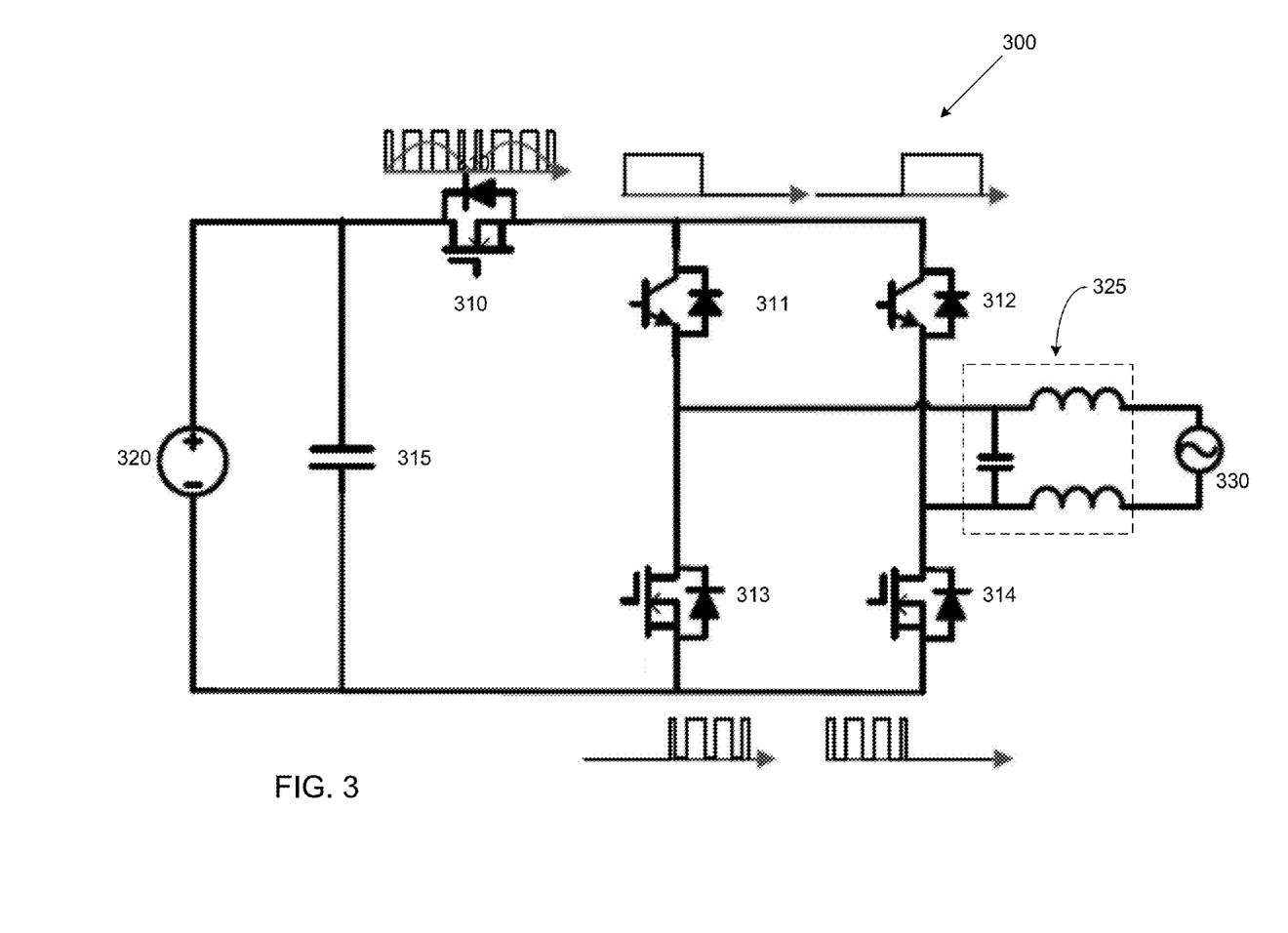
FIG. 3 is a schematic diagram of a conventional H5 topology transformer-less converter.

FIG. 1 through FIG. 3 illustrate currently available power conversion designs for use between an AC voltage source, such as an electrical power grid, and a DC voltage source, such as a photovoltaic generator, for example a solar array panel.

FIG. 1 illustrates a conventional AC to DC power converter system 100 involving two power converters in series. The first design stage is Boost Converter 105 module configured to provide for rectifying the AC line voltage received from grid 110 and configured to boost the received AC voltage to a fixed DC voltage at DC link capacitor 115. In one embodiment, the boost function may include a power factor correction facility to insure the line currents remain in proportion to line voltage in accordance with published industry standards. The next design stage is DC link capacitor 115 in an arrangement for storing the energy needed to maintain and support the DC output when the AC grid input is near zero, wherein the DC link capacitor 115 "links" the first stage rectifier to the second stage converter. The second or final stage is DC to DC converter 120 configured to provide output power regulation. In certain designs a high frequency transformer, not shown, may be included to provide galvanic isolation between the functional stage of grid 110 and Photovoltaic (PV) Generator 125. Such a high frequency transformer (not shown) may also provide for shock hazard protection.

FIG. 2 illustrates a conventional single stage converter design configured to directly invert DC to AC without an intermediate stage in the manner illustrated in FIG. 1. Single stage converter design is commonly found in current transformer-less Photovoltaic (PV) inverter systems. The photovoltaic type of inverter contemplated in FIG. 2 does not involve an isolation transformer, operating at either a low frequency or a high frequency. Typically Converter module 205 is configured to provide for inverting DC voltage 210 to AC grid voltage 215. No intermediate DC link capacitor is provided for in this design, as opposed to the two converter design illustrated in FIG. 1. In this arrangement, DC capacitor 200 is positioned in parallel with DC input 210 originating from the photovoltaic panels (not shown).

There are two main disadvantages with the single stage transformer-less converter illustrated in FIG. 2. The first is that no galvanic isolation is provided between the PV panels and the grid. In this arrangement, a common mode circuit is formed among the ground circuits and leakage currents are generated. To prevent these leakage currents, special topologies have been devised which decouple the panels from the grid during part of the switching cycle.

FIG. 3 is a schematic diagram of a conventional H5 topology transformer-less converter system 300 configured for inverting DC Input 320 to AC Output 330, via coupling circuit 325 involving an additional Switch 310, in series with inverter switches 311 through 314, purposed for decoupling the leakage currents generated between the AC and DC grounds. Such a design may be successfully employed in a photovoltaic context. While effective, additional switch 310 may contribute to power losses. In this design, DC capacitor 315 is placed at DC input 320 in parallel with the solar panels (not shown) and operates at the same voltage as the photovoltaic array. Placing DC capacitor 315 in a parallel position increases the value of capacitance required since the voltage varies as a function of solar irradiance incident on the solar array panel, or string, and voltage can typically vary from 200 to 400 volts DC, but extended ranges can go down to 200V DC. In order to deliver power without a large current ripple component at low voltages, the converter design may require a large number, or bank layout, of capacitors.

Figure 4:
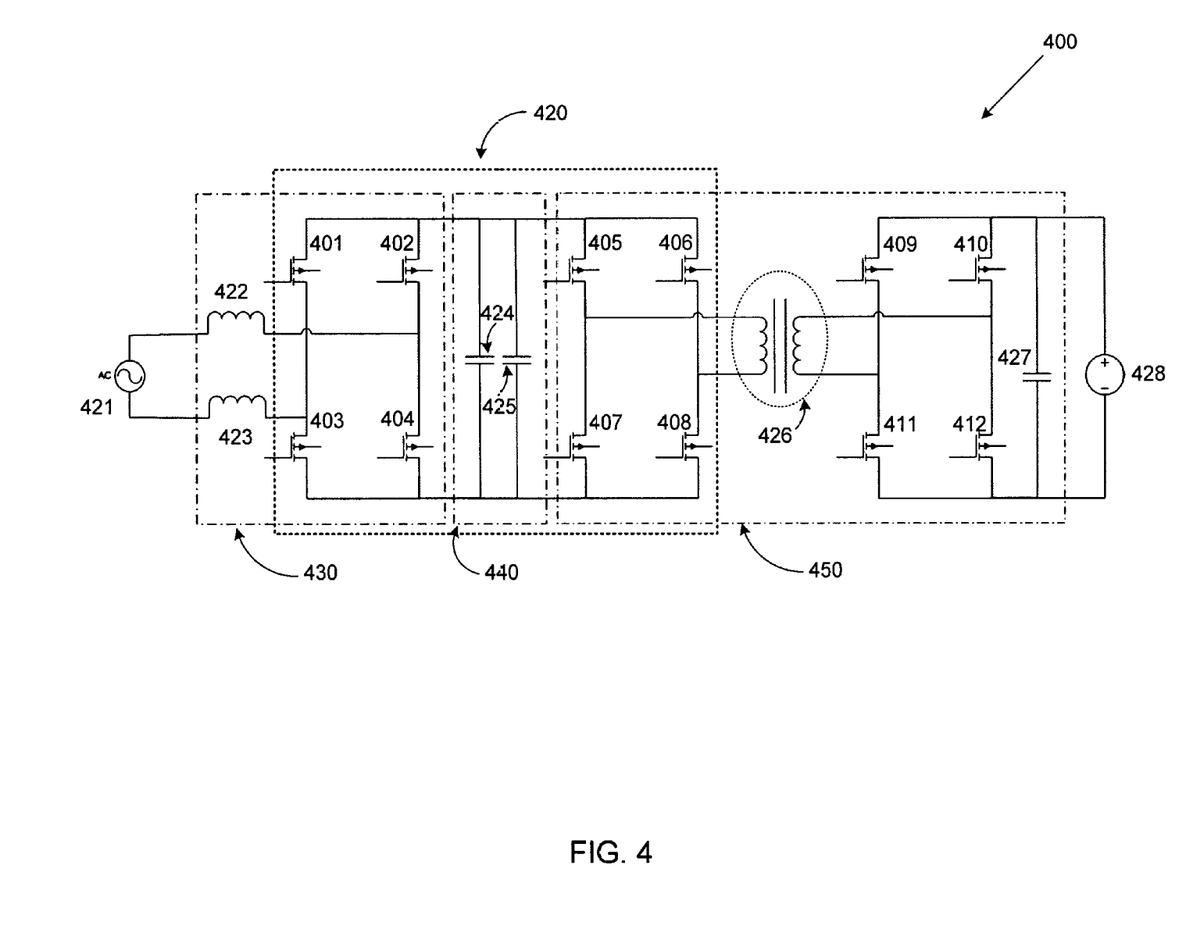
FIG. 4 is a schematic diagram for an improved converter design in accordance with the present design.

FIG. 4 illustrates a simplified schematic for an improved High Voltage AC to DC power converter system 400 in accordance with an embodiment of the present design. The exemplary switching devices shown in FIG. 4, including switches 401-412. Switches 401-412 may comprise field effect transistors (FETs), e.g. SiC MOSFETs that have an internal free-wheeling body diode. An external diode may be added in parallel with each Mosfet, such as a SiC Schottky Barrier Diode (SBD) having lower losses. An additional diode may be considered optional. Any other suitable device that may provide the same switching functionality as the foregoing devices may be employed. The present design's converter system 400 illustrated in FIG. 4 may include a full-bridge bi-directional circuit arrangement 420 as shown. Alternately, the design topology may be realized using half-bridge, unidirectional bridge, resonant, semi-resonant, and like switching arrangements.

Broken down, the left side of the diagram shows a single phase AC energy source 421 coupled to inductors 422 and 423 within AC-DC Boost Converter 430, which also includes switches 401, 402, 403, and 404. Optionally, a single inductor may be employed in either leg instead of two inductors. DC Link Capacitor section 440 includes capacitors 424 and 425, while isolated DC-DC Converter 450 includes switches 405-412, high frequency transformer 426, and capacitor 427. Single or multiple capacitors in parallel may be employed depending on packaging, dielectric materials, and other relevant factors. To the right is DC voltage source 428.

Not shown in FIG. 4 is a controller coupled to the High Voltage AC to DC power converter system 400, where the controller is configured to influence operation of the High Voltage AC to DC power converter system 400 to manage power transfer between single phase AC energy source 421 and DC voltage source 428 using switches 401-412.

The converter conceptually uses the same basic two stage topology of FIG. 1. However, DC link capacitors 424 and 425 operate at a much higher voltage than the capacitor of FIG. 1. The present design's operation at higher voltage may allow for a reduction in realized capacitance over current designs, such as the design illustrated in FIG. 1, and may facilitate the use of film capacitors.

DC Voltage Ripple Effects

Figure 5:
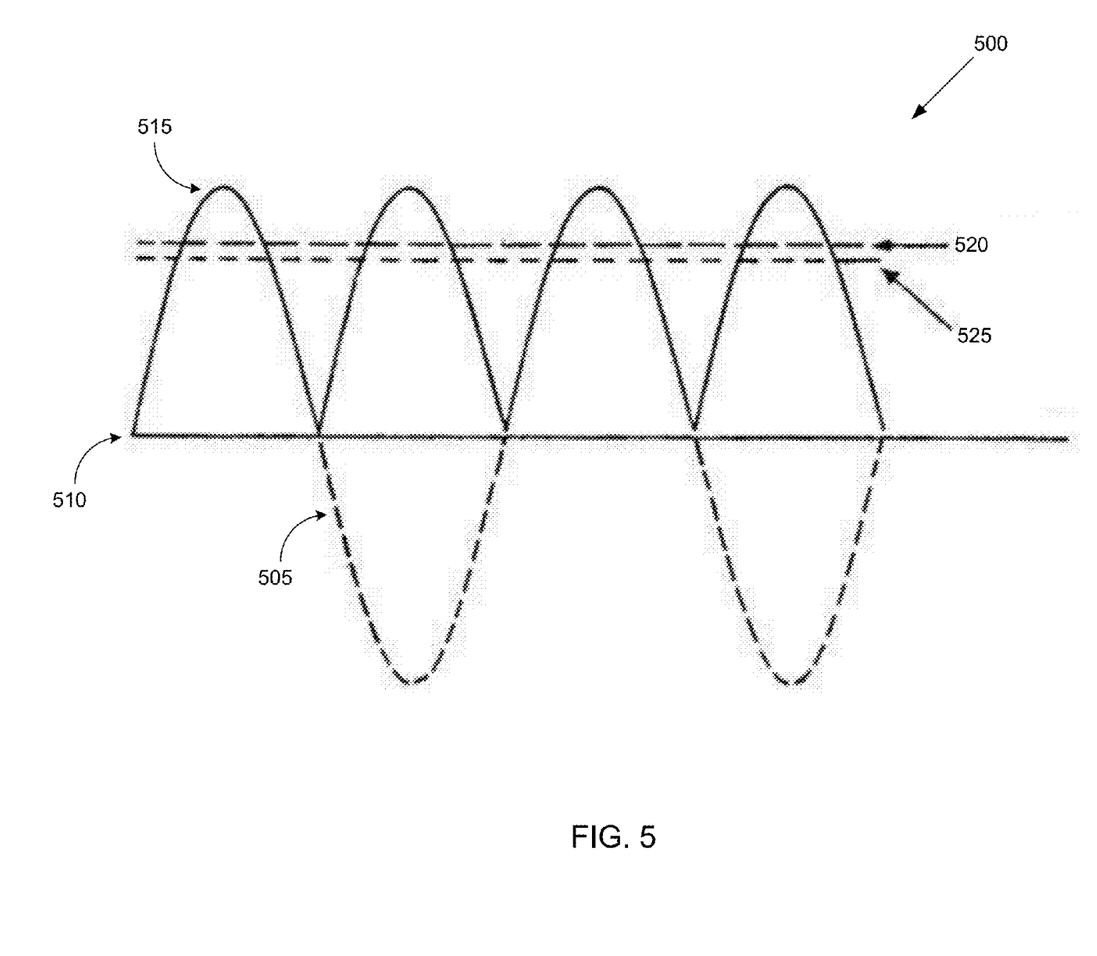
FIG. 5 illustrates the relationship between AC input to DC output and the resultant DC ripple effect in accordance with an embodiment of the present design.

FIG. 5 illustrates the relationship between AC input to DC output and the resultant DC ripple effect in accordance with an embodiment of the present design. AC voltage 505 provided in FIG. 5 is illustrated as being time variant from zero volts, at point 510, to a peak value, at point 515, at the operating line frequency. In the situation where no intermediate energy storage mechanism is provided, the power available for the DC output, shown as root-mean-squared (RMS) value 520, and time average value 525, would be a sine squared waveform at twice the line frequency. In order to mitigate the ripple generated, energy storage is needed to keep the alternating power from affecting the DC output. In most single phase AC to DC converters a capacitor is provided to store the required energy to keep DC ripple at a reasonable level. The acceptable amount of DC ripple voltage varies with the application. For battery charging applications DC ripple voltage can vary from roughly one to ten percent. The effect will be mainly heating and electrochemical reaction with certain batteries. For photovoltaic applications the acceptable DC ripple is usually five percent or less. Management of both loading and DC ripple are thus important.

Figure 6:
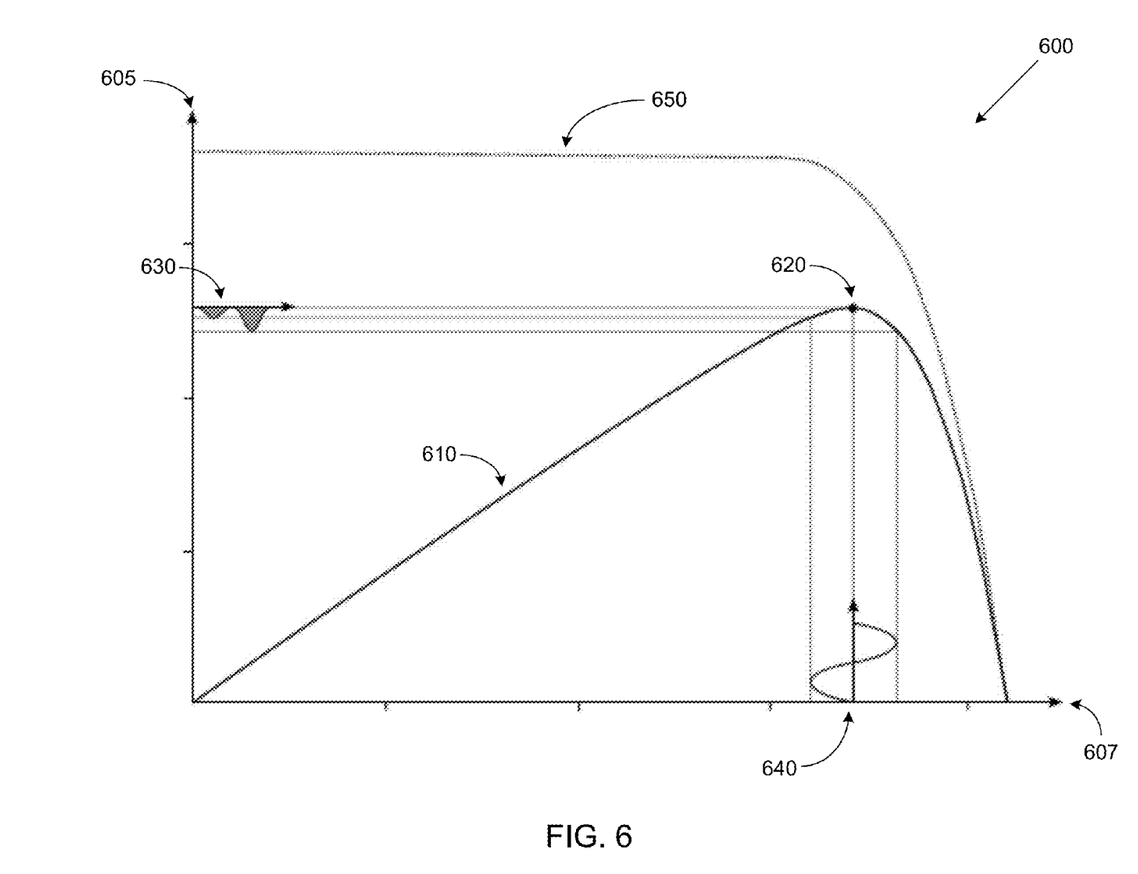
FIG. 6 illustrates the effect of DC ripple voltage on Maximum Peak Power Tracking (MPPT) control in accordance with an embodiment of the present design.

FIG. 6 illustrates the effect of DC ripple voltage on Maximum Peak Power (MPP) control in accordance with an embodiment of the present design. FIG. 6 illustrates a plot of power 605 versus voltage 607 for a typical PV solar panel array power curve 610. There is an optimal point 620 on the power curve that will harvest maximum energy. The optimal point 620 constantly varies with solar irradiance, shading, and temperature. All PV inverter systems have a control algorithm called maximum peak power tracking (MPPT) configured to maintain a proper load level on the solar panel array, or string. Changes in DC voltage tend to cause a deviation away from the MPPT point and decrease efficiency. The shaded area 630 represents power lost due to DC voltage ripple and the related change or variance in AC voltage delta 640. A line representing current 650 is also shown.

Electrolytic Capacitor Reliability

In a conventional AC to DC converter, the amount of capacitance is relatively large. Electrolytic capacitors are typically chosen to decouple the power pulsation from a single phase AC power source. Electrolytic capacitors have a high capacitance to volume ratio and tend to be very good at bulk energy storage at low frequencies and voltages below 450 V. However, the lifetime of an electrolytic capacitor is limited because the electrolytes within evaporate over time. As a result, the lifetime of the converter is also shortened.

The life of an electrolytic capacitor is affected by temperature and applied voltage. The lifetime equation for a typical capacitor is provided in equation [1]:

$$L_n = L_O * 2^{(To-T)/10} * 2^{1-(\frac{Ia}{Ir})2} \quad [1]$$

where $L_n$ is the lifetime to be estimated and $L_o$ is the base lifetime given in the datasheet. $T_o$ is the actual ambient temperature in ° C. of the capacitor under which the base lifetime is tested, and T is the actual ambient temperature in ° C. $I_r$ is the specified maximum allowable ripple current (Arms) at an applied $T_o$, and $I_a$ is the applied ripple current through the capacitor. Examining the relationship provided in equation [1] yields that the lifetime is affected by both operating temperature and applied ripple current.

The longest lifetime of aluminum electrolytic capacitors from leading manufacturers is 20,000 hours at 85° C. The Department of Energy's target of a twenty-year lifetime for PV inverters equates to 80,300 hours based on 11 hours per day for 20 years. Even with careful measures to reduce ripple current and heating, the life of these capacitors can only be doubled to 40,000 hours which is ten years. This does not necessarily mean that the converter will fail at five to ten years as electrolytic material loses capacitance slowly when the electrolyte evaporates. However, at twenty years there will certainly be more DC ripple and possibly capacitor failures. As a result, replacement of electrolytic capacitors in a twenty year life power converter can be important.

Calculation of DC Link Capacitance

The energy stored in a capacitor is expressed in the formula presented in equation [2]:

$$E=CV^2/2 \quad [2]$$

Solving equation [2] for the required capacitance, may be as expressed in form of equation [3]:

$$C=2E/V^2 \quad [3]$$

From equation [3] the amount of capacitance needed decreases as the square of the applied voltage. The present design decreases the amount, or size, of DC link capacitors employed by increasing the voltage level in accordance with the relationship represented in equation [3].

The amount of DC link capacitance needed for a single phase AC to DC converter is calculated in equation [4]:

$$C=P/(\omega grid*Vc*\Delta vc) \quad [4]$$

where C is DC link capacitance, P is Power, $\omega$grid is grid frequency, which is $2\pi*60$ Hz, Vc is capacitor voltage, and $\Delta$vc is voltage ripple at five percent.

The following sections present examples of converters operating at 10 kilowatts with a line voltage of 240 VAC at 60 Hz, assuming the maximum voltage ripple allowed is five percent. The amount of capacitance required is provided for each example.

Single Stage Converter

The first example is a single stage, transformer-less photovoltaic inverter using an overall construction similar to that shown in FIG. 2. With only one conversion stage, the DC link capacitor is placed on the DC input side in parallel with the PV panels. Most PV systems are arranged with the panels in series to form a "string" of 10-20 panels, raising the array voltage to a nominal value of approximately 200-400 volts DC. The array output voltage varies as a function of solar irradiance and is dependent on azimuth, shading, and other factors. The loading of the panels is a consideration when harvesting the maximum energy from the array.

PV inverter systems have a load management algorithm known as MPPT configured for tracking panel output and providing an optimal load. Since the DC capacitor is in parallel with the array in the FIG. 2 arrangement, the DC capacitor has the same voltage which can vary from approximately 200 to 400V DC. Capacitance is determined by the lowest voltage within the operating voltage range, here 200V DC, resulting in the capacitance shown in equation [5].

$$C=(10,000)/(2\pi*60*200*15)$$

$$C=8846 \ \mu f \quad [5]$$

This amount of capacitance can be implemented using electrolytic capacitors. One implementation employs several commercial 820 µf/400V capacitors in parallel. In this arrangement, an eleven capacitor arrangement may be provided. Size may vary, but one example is each capacitor in the eleven capacitor arrangement having a diameter of 35 mm and height of 50 mm.

Conventional Two Stage Converter

Another example is a two stage converter having a general construction similar to the construction of FIG. 1. Since the DC link is decoupled from the PV array, a DC link voltage of 350V DC is employed in the calculations because it is higher than the peak rectified line voltage but suitable for use with 600V insulated-gate bipolar transistors (IGBTs) and 450V aluminum electrolytic capacitors. The required capacitance is determined in equation [6]:

$$C=(10,000)/(2\pi*60*350*17.5)$$

$$C=4,330 \ \mu f \quad [6]$$

This calculation results in a lower value for capacitance as compared with the first example above. Again, a DC link capacitance link may be employed to provide the necessary 4,330 µf capacitance level. One implementation is eight 560 µf/450V capacitors, where one example is a bank of eight capacitors each having dimensions of 35 mm (diameter) and 45 mm (height).

High Voltage DC Link Converter.

The third example includes multiple 1200 volt rated switches, such as a silicon carbide (SiC) field effect transistors (FETs) and diodes. This arrangement allows for an increase in the DC bus voltage. This example utilizes the relationship wherein capacitance needed decreases as the square of the voltage ratio.

This implementation includes a two stage converter arrangement with a 900V DC link voltage, rated at up to 10 KW power. The required capacitance is determined in equation [7]:

$$C=(10,000)/(2\pi*60*900*15)$$

$$C=590\ \mu f \quad [7]$$

This is a small capacitance value as compared to the previous examples. Capacitance is reduced approximately 15:1 between the first example and this implementation, and 7:1 between the second example and this implementation.

In one embodiment, an arrangement of a series/parallel bank of electrolytic capacitors may be provided, where the capacitors are much smaller than the banks of eleven previously disclosed. In another embodiment, metalized plastic film capacitors may be employed. Film capacitors are known to have a lower capacitance-to-volume ratio but excel at high voltages. Film capacitors exhibit virtually no lifetime wear issues as compared with electrolytic capacitor construction. The present design may employ polypropylene film capacitors with 100,000 hours lifetime. In one arrangement, the present design may be realized using a set of four 140 μf/1000V film capacitors. In one construct, each capacitor may have a diameter of 84 mm and height of 64 mm.

In this arrangement, the design may provide for an inverter capable of a reliable 20 year lifespan. The DOE 20 year goal equates to 80,300 hours. Current film capacitors have a 100,000 hour life (25 years).

Figure 7:
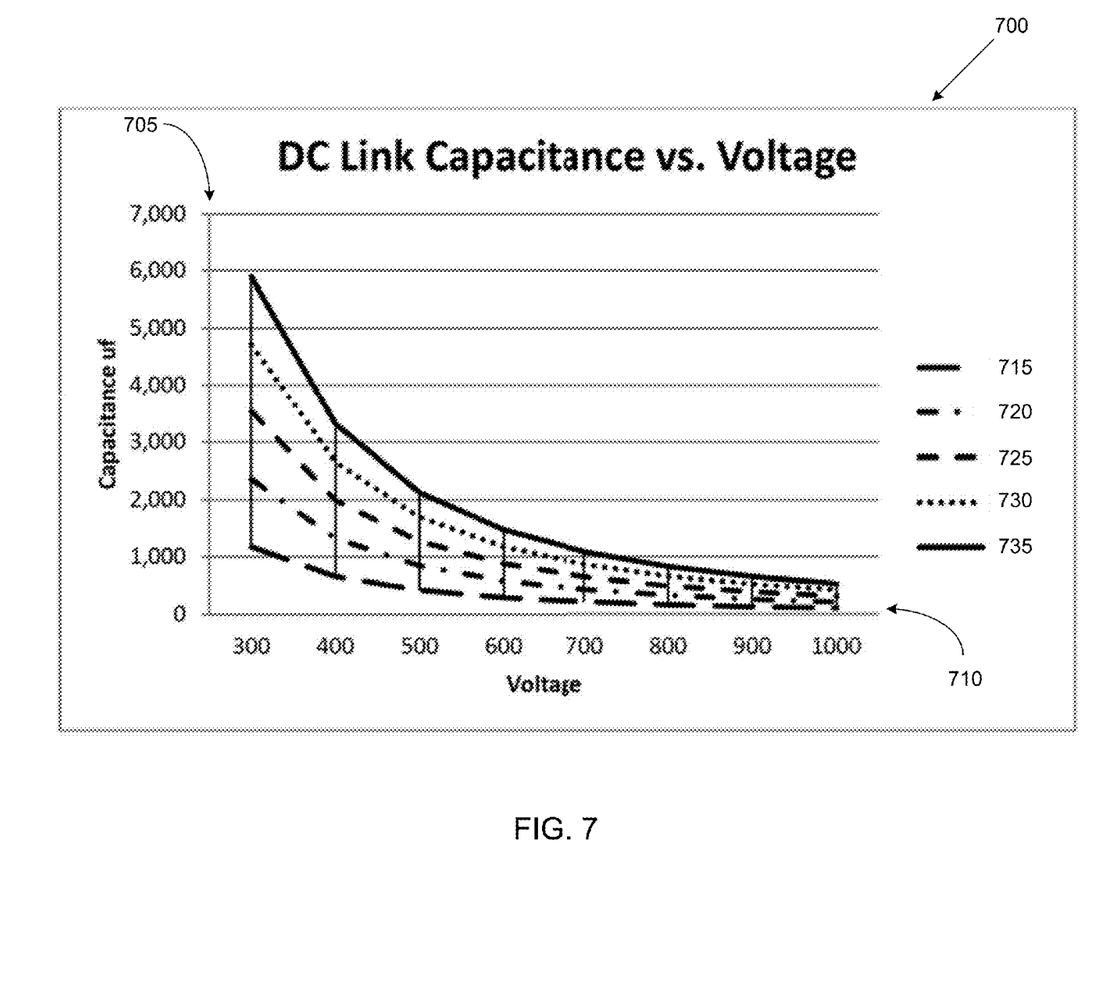
FIG. 7 illustrates the relationship between capacitance and voltage for various power levels in accordance with an aspect of the present design.

FIG. 7 illustrates the relationship between capacitance and voltage for various power levels in accordance with an aspect of the present design. The curves are plotted for capacitance 705 in micro farads (μf) on the vertical axis versus DC Link voltage 710 on the horizontal axis. Curves for fixed power levels of 2 KW are represented at legend point 715, 4 KW represented at legend point 720, 6 KW represented at legend point 725, 8 KW represented at legend point 730, and 10 KW represented at legend point 735. From the curves illustrated in FIG. 7, capacitance values decrease exponentially with applied voltage and are found to dip below 1,000 μf at voltages of 750V and above regardless of power level. Further examination indicates that operating at lower power levels may provide for lower DC ripple resulting from a more effective capacitance at a given power level.

Thus a reliable AC to DC Converter is disclosed. The converter is comprised of two conversion stages to decouple the DC link capacitors from the DC input. This allows increasing the DC link voltage which in turn reduces the amount of required capacitance for energy storage. The relationship between capacitance and voltage decreases exponentially. Reduced capacitance at a higher voltage permits using metalized film capacitors instead of aluminum electrolytic capacitors. Film capacitors have substantially longer lifetimes which improve the reliability of the converter to meet industry demands. New semiconductor switches such as wide band-gap devices with higher breakdown voltages and lower switching losses are a good match for operating at the higher DC link voltages. The present design may provide for the potential to double the lifetime of the conventional AC-DC converter.

An improved AC-DC converter with a high voltage DC link is disclosed. The converter can be used in many power conversion applications such as photovoltaic solar inverters, motor drives, backup power and electric vehicle charging to name a few. In photovoltaic PV inverters in particular, the inverter converts the DC power from the solar panels to AC power to feed the power grid. The solar industry and U.S. Department of Energy would like to see PV inverters with a 20 year life to match the lifetime of the panels. Conventional PV inverters have a 10 year life due to the use of aluminum electrolytic capacitors in their design. These capacitors are needed to store energy in the power conversion process and have a limited life due to drying out of the liquid electrolyte. The improved system uses a DC link voltage of 750-1,000 volts which is 2-4 times higher than a conventional converter. Since the amount of energy stored in a capacitor is a function of the voltage squared, doubling the voltage will quadruple the energy stored. Conversely, the amount of capacitance needed can be significantly reduced by increasing the DC link voltage.

In the present design, the DC link voltage is increased to reduce the required capacitance that will permit the use of metalized film capacitors. This type of capacitor is highly reliable since it has no liquid electrolyte and is self-healing. Predicted lifetimes are over twenty years at the design margins proposed. Another enabling technology is the use of wide band-gap semiconductors such as silicon carbide (SiC) field effect transistors and diodes. These devices have 10 times the breakdown voltage of silicon and higher operating temperatures. At higher operating voltages we can use 1200V SiC FETs instead of slow and lossy silicon IGBTs for the power switches and improve efficiency.

Thus according to one embodiment of the present design, there is provided an AC to DC converter system. The system includes a single phase AC energy source, a DC energy source, a bi-directional AC to DC boost converter circuit coupled to the single phase AC energy source, and a high voltage intermediate DC link circuit coupled to the bi-directional AC to DC Boost Converter and comprising at least one film capacitor.

According to a second embodiment of the present design, there is provided an AC to DC converter system comprising an AC input and a DC input, a bidirectional boost converter circuit coupled to the AC input, a high voltage DC link capacitor circuit coupled to the bidirectional boost converter and comprising multiple capacitors connected in parallel, and a DC to DC converter circuit coupled to the high voltage DC link capacitor circuit and the DC input.

Thus according to a further embodiment of the present design, there is provided an AC to DC converter system comprising an AC input and a DC input, bidirectional boost converter means coupled to the AC input, high voltage DC link capacitor means coupled to the bidirectional boost converter means and comprising multiple capacitors connected in parallel, and DC to DC converter means coupled to the high voltage DC link capacitor means and the DC input.

Alternately, the design may include a bidirectional boost converter circuit coupled to an AC input, a high voltage DC link capacitor circuit coupled to the bidirectional boost converter and comprising at least one capacitor, and a DC to DC converter circuit coupled to the high voltage DC link capacitor circuit and a DC input, wherein the at least one capacitor may include a film capacitor.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. An AC to DC converter system, comprising:
   a single phase AC energy source;
   a DC energy source;
   a bi-directional AC to DC boost converter circuit coupled to the single phase AC energy source and comprising a first plurality of switches rated for 1200V;
   a high voltage intermediate DC link circuit coupled to the bi-directional AC to DC Boost Converter circuit and comprising a plurality of metalized plastic film capacitors connected in parallel; and
   an isolated DC to DC converter connected to the high voltage intermediate DC link circuit and comprising:
      a second plurality of switches rated for 1200V;
      a third plurality of switches rated for 1200V and separated from the second plurality of switches by a high frequency transformer; and
      a further capacitor connected in parallel with the third plurality of switches and connected to the DC energy source;
   wherein a high voltage intermediate DC link circuit voltage of at least 750V and output power up to 10 KW is employed with the plurality of metalized plastic film capacitors connected in parallel at a capacitance below 1000 μf.

2. The AC to DC converter system of claim 1, further comprising a controller configured to influence operation of the AC to DC converter system to manage power transfer among the single phase AC source and the DC energy source using at least the bi-directional AC to DC boost converter circuit.

3. The AC to DC converter system of claim 2, wherein the first plurality of switches is controlled by the controller.

4. The AC to DC converter system of claim 3, wherein the first plurality of switches comprises at least one field effect transistor.

5. The AC to DC converter system of claim 1, wherein the first plurality of switches, second plurality of switches, and third plurality of switches each comprise four switches.

6. The AC to DC converter system of claim 1, wherein the bi-directional AC to DC boost converter circuit comprises an inductor.

7. An AC to DC converter system comprising:
   an AC input and a DC input;
   a bidirectional boost converter circuit comprising a first plurality of switches rated for 1200V and coupled to the AC input;
   a high voltage DC link capacitor circuit coupled to the bidirectional boost converter and comprising multiple metalized plastic film capacitors connected in parallel; and
   a DC to DC converter circuit coupled to the high voltage DC link capacitor circuit and the DC input and comprising:
      a second plurality of switches rated for 1200V;
      a third plurality of switches rated for 1200V and separated from the second plurality of switches by a high frequency transformer; and
      a further capacitor connected in parallel with the third plurality of switches and connected to the DC input;
   wherein a high voltage intermediate DC link circuit voltage of at least 750V and output power up to 10 KW is employed with the multiple metalized plastic film capacitors connected in parallel at a capacitance below 1000 μf.

8. The AC to DC converter system of claim 7, wherein the AC to DC converter system is free of electrolytic capacitors.

9. The AC to DC converter system of claim 7, further comprising a controller configured to influence operation of the AC to DC converter system to manage power transfer among the single phase AC source and the DC energy source using at least the bi-directional AC to DC boost converter circuit.

10. The AC to DC converter system of claim 9, wherein the first plurality of switches is controlled by the controller.

11. The AC to DC converter system of claim 10, wherein the first plurality of switches comprises at least one field effect transistor.

12. The AC to DC converter system of claim 7, wherein the first plurality of switches, second plurality of switches, and third plurality of switches each comprise four switches.

13. The AC to DC converter system of claim 7, wherein the bidirectional boost converter circuit comprises an inductor.

14. An AC to DC converter system comprising:
   an AC input and a DC input;
   bidirectional boost converter means coupled to the AC input;
   high voltage DC link capacitor means coupled to the bidirectional boost converter means and comprising multiple metalized plastic film capacitors connected in parallel; and
   DC to DC converter means coupled to the high voltage DC link capacitor means and the DC input and comprising:
      first switching means rated at 1200V;
      second switching means rated at 1200V and separated from the first switching means by a high frequency transformer; and
      a further capacitor connected in parallel with the second switching means and connected to the DC input;
   wherein a high voltage intermediate DC link capacitor voltage of at least 750V and output power up to 10 KW is employed with the multiple metalized plastic film capacitors connected in parallel having capacitance below 1000 μf.

15. The AC to DC converter system of claim 14, wherein the bidirectional boost converter means comprise:
   a plurality of switches; and
   at least one inductor.

16. The AC to DC converter system of claim 14, wherein the bidirectional boost converter means comprise a plurality of switches controlled by controlling means.

17. The AC to DC converter system of claim 14, wherein the first switching means comprise at least one field effect transistor.

18. The AC to DC converter system of claim 14, wherein the AC to DC converter system is free of electrolytic capacitors.

19. The AC to DC converter system of claim 14, wherein the first switching means, second switching means, and third switching means each comprise four switches.

* * * * *